United States Patent
Olson

[15] 3,648,972
[45] Mar. 14, 1972

[54] VACUUM CONTROL VALVE

[72] Inventor: Harlan D. Olson, Portland, Oreg.

[73] Assignee: Cascade Corporation, Portland, Oreg.

[22] Filed: Apr. 23, 1970

[21] Appl. No.: 31,254

[52] U.S. Cl. ................................................251/339, 137/612.1
[51] Int. Cl. ..................................................................F16k 31/44
[58] Field of Search................251/339, 354, 347, 348, 340, 251/341; 137/612.1; 214/650 SG

[56] References Cited

UNITED STATES PATENTS

| | | | |
|---|---|---|---|
| 3,239,192 | 3/1966 | Totten | 251/339 |
| 345,224 | 7/1886 | Fitz-Gerald | 251/339 X |
| 2,486,729 | 11/1949 | Beckley | 251/339 X |
| 3,045,694 | 7/1962 | Hammon | 137/612.1 X |
| 3,089,723 | 5/1963 | Fortson et al. | 214/650 SG |
| 3,166,290 | 1/1965 | Sherman | 251/339 X |
| 3,276,611 | 10/1966 | Horton | 214/650 SG |
| 3,326,593 | 6/1967 | Farmer et al. | 214/650 SG |
| 3,376,061 | 4/1968 | Harris et al. | 214/650 SG |
| 3,433,456 | 3/1969 | Mueller | 251/339 |

Primary Examiner—Samuel Scott
Attorney—Kolisch & Hartwell

[57] ABSTRACT

A contact-operated valve for controlling the supply of vacuum to a vacuum-operated lift plate adapted for handling load objects such as paper rolls. The valve includes a base member retained in an opening in the center of a main plate forming the back of the lift plate. The base member includes outer walls that define a cylindrical inner bore closed on one end by an end wall. The end wall includes a raised platform portion having an opening formed therein adapted to communicate with a vacuum supply line connected to the back of the lift plate. A valve seat is formed around the opening, adapted to be closed by a rubber valve member. A generally semispherical, hollow nylon ball is provided having sidewalls adapted to fit loosely within the cylindrical bore in the base member to permit airflow therearound. An elongate center post is secured to the inner periphery of the ball, adapted to extend through the opening in the platform portion. The rubber valve member is secured to the center post, and is normally biased into contact with the valve seat by a compressed spring confined between the base member and the inner periphery of the nylon ball. Contact of the curved outer surface of the ball with a load object, sufficient to overcome the spring force, moves the ball within the cylindrical bore and opens the valve.

5 Claims, 3 Drawing Figures

PATENTED MAR 14 1972

3,648,972

HARLAN D. OLSON
INVENTOR.

BY Kolisch & Hartwell
ATTY.

VACUUM CONTROL VALVE

BACKGROUND OF THE INVENTION

The invention relates to an improved valve structure. More particularly, the invention concerns an improved contact-operated valve adapted to control the supply of vacuum to a vacuum-operated load grab.

Vacuum-operated load grabs or lift plate assemblies are widely used in lifting and transporting cumbersome objects. Such load grabs generally comprise at least one lift plate having a resilient outer rim which can be brought into sealing contact with the surface of an object to be lifted, to form a closed space between the lift plate and the object. A contact-operated valve is usually provided for the lift plate to selectively connect a source of vacuum to the closed space for evacuation thereof when contact is made with the object to be lifted. The holding and lifting force exerted on the object by the lift plate is due to the difference between atmospheric pressure on the outer surface of the lift plate and vacuum pressure within the evacuated space.

Such load grabs provide a convenient means for using a conventional lift truck to grasp and carry paper rolls and other articles, without pallets. In order to lift such large and ponderous objects a single load grab assembly may include a plurality of lift plates. Usually a contact-operated valve is provided for each lift plate so that the source of vacuum is conserved. Placement of the valve on the lift plate eliminates the necessity of repeatedly evacuating a system of supply hoses, since the lift plate is connected to the vacuum source only when the load grab is in contact with an object to be lifted.

Also if the object to be lifted is somewhat smaller than the load grab, one or more of the lift plates may be opened to the atmosphere. In such cases, the use of a contact-operated valve with each lift plate permits the vacuum source to be shut off from the open lift plates and proper vacuum conditions to be maintained in the lift plates which do embrace the object to be lifted. This enables a further conservation of the vacuum supply.

Automatic valves heretofore proposed for the above purpose have been expensive and complicated, and subject to damage by the relatively rough treatment normally experienced by material-handling equipment. In particular the initial contact between the load grab and the load involves significant impact, much of which is absorbed by the valve. Also, some prior art valves have rendered vacuum-operated handling systems slow acting and unable to provide a quick grasp of the object to lift it.

An improved valve is described in U.S. Pat. No. 3,291,518 to Weinert. However, the Weinert valve, which includes closable slits in the ball member, is subject to unsatisfactory wear upon repeated operation. In particular, the ends of the slits in the valve body tend to tear, and such tears prevent the valve from maintaining the proper vacuum conditions within the lift plate.

SUMMARY OF THE INVENTION

Accordingly, it is an object of the invention to provide a valve for the purpose described above, which will overcome the shortcomings and disadvantages of conventional valves.

It is another object of the invention to provide a valve having fast response when an object to be lifted is engaged by a lift plate.

It is a further object of the invention to provide a valve which opens and closes easily and positively, and which, when closed, maintains vacuum in the supply line in the usual vacuum-operated load grab.

It is yet another object of the invention to provide an inexpensive valve of simple construction which is more durable and wear resistant than valves used in the prior art.

The foregoing objects are attained by a valve design which includes a base member retained in an opening near the center of the lift plate associated therewith. The base member includes upstanding outer walls that define a cylindrical inner bore closed on one end by an end wall. The end wall includes a raised platform portion having a circular opening formed therein defining a valve seat. A hollow, semispherical nylon ball is provided, having side walls adapted to fit loosely within the cylindrical bore for reciprocal movement. An elongate center post is attached to the inner periphery of the ball, adapted to extend through the circular opening. An elastomeric valve member is secured to the end of the center post. A compressed resilient member, such as a coil spring, is confined between the ball and the base to bias the valve member closed against the valve seat. The ball is mounted in a position extending beyond the rim for initial contact with a load object. When the ball is contacted by a load object to be lifted, the ball is forced into the cylindrical bore overcoming the spring force and opening the valve. When the valve is open, a vacuum supply is placed in communication with the closed space under the lift plate for evacuating the space. A separate valve is provided on the vacuum supply line to admit air to the line for releasing the lift plate.

BRIEF DESCRIPTION OF THE DRAWINGS

Other objects and advantages of the invention will become apparent from the following detailed description of the invention, taken in conjunction with the accompanying drawings, wherein.

DETAILED DESCRIPTION OF THE INVENTION

Figures 1, 2, 3:
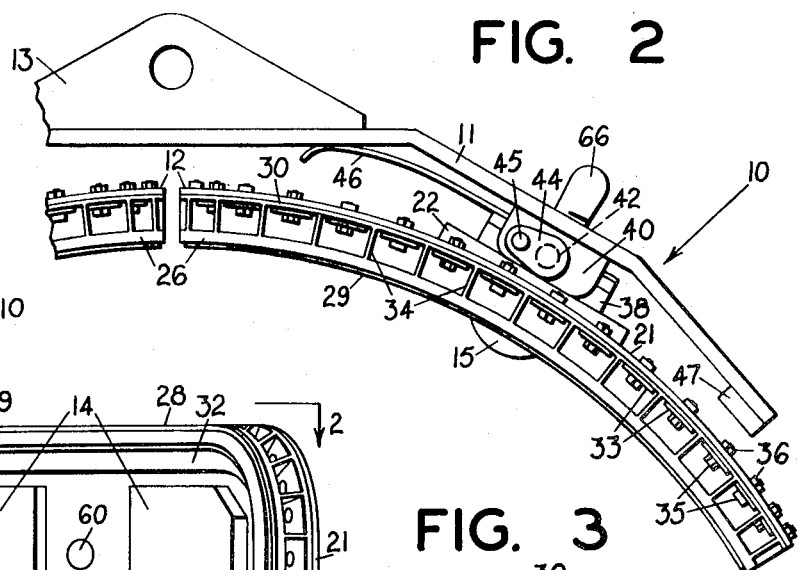
FIG. 1 is a front elevation view of a load grab in a material-handling apparatus, including a plurality of lift plates each having a contact-operated valve.
FIG. 2 is a cross-sectional view taken along lines 2—2 in FIG. 1.
FIG. 3 is an enlarged cross-sectional view taken along the lines 3—3 in FIG. 1.

Referring now to the drawings, a preferred embodiment of the invention is illustrated comprising a vacuum-operated load grab 10 for lifting and carrying large rolls of paper. The load grab arrangement generally comprises six lift plates 12 mounted on a common equalizer plate 11. The equalizer plate is adapted to be mounted upon a lifting and carrying device such as a lift carriage 13 forming part of a lift truck. To accommodate the circular conformation of the paper rolls, the lift plates 12 and the equalizer plate 11 are curved so that the rims of the lift plates will generally correspond to the curvature of a paper roll standing on end.

It should be realized that load grabs are not limited to use with lift trucks nor for lifting cylindrical objects. Thus, for grasping flat-sided objects, a flat equalizer plate and/or flat lift plates could be used with equal facility. Likewise, the lift plates illustrated could be used with material-handling equipment other than a lift truck.

As shown, each lift plate 12 comprises a curved main plate 21 having a backing plate 22 secured to the back thereof, such as by welds 23. One or more conventional shear pads 14 are secured to the main plate, adapted to contact the load. Use of these pads is not mandatory but does facilitate the handling of heavy loads. The main plate and backing plate are formed with aligned circular openings 24, 25 therein adapted to receive and confine a valve 15 described in detail hereinafter.

The main plate is provided with a resilient outer rim 26 secured thereto, forming a mouth for the lift plate. An outer platform 28 of rim 26 is adapted to contact and form a pressure seal with the surface of an object, such as a paper roll, to be lifted. Accordingly, outer platform 28 includes a portion 29 of soft sealing material. Rim 26 otherwise includes a mounting flange 30 and an inclined side wall 32 secured thereto. The mounting flange, side wall, and outer platform are connected together by ribs 34 located at regular intervals on the outside of the rim. The mounting flange of the rim is clamped to the main plate by elongate strips or washers 33 positioned between the ribs. The washers are held in place by bolts 35 located through appropriate holes in the rim assembly and capped by nuts 36.

The main plate and backing plate are pivotally secured to the equalizer plate by mounting brackets 38 on the backing plate and corresponding brackets 40 on the equalizer plate, arranged to extend adjacent to brackets 38. Aligned cylindrical bores 41 are formed in brackets 38, 40 adapted to receive pins 42. Washers 44 are provided over the outer ends of the pins to retain the latter in position, and cap screws 45 extend through suitable holes in the washers and engage corresponding threaded holes in brackets 40 to retain the washers.

A leaf spring 46 is secured to the back of the lift plate assembly, adapted to engage the equalizer plate to maintain the lift plate at a desired angle with respect to the equalize plate. Pad 47 is provided at the outer edge of the equalizer plate to cushion any impact between the back of the lift plate and the equalizer plate.

Referring particularly to FIG. 3, the structure of a valve is illustrated, generally comprising a base member 51 having a hemispherical ball 52 reciprocally retained therein. The base member is generally cup-shaped, including side walls 53 which define a cylindrical inner bore closed at one end by a base wall 54 having an elevated portion 55. A flange 56 is formed about the periphery of side walls 53. The flange is adapted to fit within an annular groove 58 defined between the backing plate and bracket 38. A sealing ring 59 is provided between the flange and the backing plate, adapted to form a pressure seal therebetween when cap screws 60 are tightly secured retaining the members together.

Elevated portion 55 of base wall 54 has a circular opening 62 formed therein. As shown, the edges of the wall surrounding the opening are suitably finished to define a valve seat 63 on the inner side of the opening in communication with an inner chamber 64 formed between the base wall and bracket 38.

A source of vacuum, not shown, communicates with chamber 64 via a length of tubing 66 secured within a threaded hole 67 in bracket 38.

The ball portion of the valve includes a generally hollow, hemispherical member 70, having straight side walls 72 depending from the edge thereof, and an elongate post 73 secured to the inner periphery thereof. The ball member is fabricated of nylon or some other material having a low coefficient of friction. Member 70 is mounted for reciprocal movement within the base portion of the valve, with side walls 72 adapted to fit loosely within the cylindrical bore defined by walls 53.

Post 73 is adapted to extend through opening 62. An elastomeric valve member 76 is secured to the end of post 73 by a screw 78 engaging a threaded hole 79 in the outer end of the post. Valve member 76 is adapted to engage the valve seat for forming a sealing contact therewith and to limit the outward movement of the ball of the valve. A coil spring 80 is provided, having one end loosely mounted over elevated portion 55 of the base member and the other end confined adjacent an annular retaining ring 82 formed around the inner periphery of the ball member.

Spring 80 is normally under compression and tends to hold the valve member in firm engagement with the valve seat. However, the spring can be compressed by force exerted on the outer surface of the ball, tending to drive the ball into the cylindrical bore. As the ball is moved inwardly, the valve member is unseated, permitting air to be evacuated through the valve by the vacuum supply. Sufficient clearance exists between the side walls of the cylindrical bore and the ball member to permit ample airflow therebetween during such evacuation. However, if desired, holes can be provided in the surface of the ball member to facilitate air movement through the valve.

In using the lift plate described and illustrated, the equalizer plate is maneuvered over an object to be lifted, such as a cylindrical paper roll, by means of the lift truck carriage. When properly positioned, the equalizer plate is moved into contact with the paper roll. As the rim of a lift plate comes into contact with the paper roll, the ball of valve 15 associated therewith is forced inwardly with respect to the valve base. At the same time the resilient rim of the lift plate is depressed slightly and conforms to the shape of the paper roll, forming a seal between the surface of the roll and the lift plate. Accordingly, as valve 15 opens, the vacuum supply serves to evacuate the space between the lift plate and the paper roll. This creates a pressure imbalance and provides sufficient shear force between the lift plate and the paper roll to permit the latter to be lifted and transported by the lift truck.

If the object to be lifted is not sufficiently large to be embraced by all the lift plates of the assembly, the valves which are not contacted remain closed and the vacuum supply to the active lift plates is not impaired. Release of the evacuated lift plates is accomplished upon completion of the move by a main valve, not shown, under the control of the operator of the lift truck. The main valve momentarily shuts off the vacuum supply and admits atmospheric pressure into the vacuum supply tubes 66.

The valve described is particularly advantageous since it is durable and not subject to excessive wear over extended periods of operation. The ball member, being fabricated of nylon, is smooth and self-lubricating. Consequently, engagement of the paper roll by the lift plate from almost any angle will act to force the ball member inwardly rather than skewing or jamming it in the cylindrical bore. Therefore, the valve is extremely reliable. The spring biasing the valve can be selected to provide any desired operating force for the valve, and will tend to maintain the selected force over a period of extended use. Consequently, the valve need not be recalibrated. It should also be noted that the valve member and valve seat are arranged so that the force exerted by the vacuum supply tends to open the valve. This results in minimal wear upon the valve seat and valve member.

It is claimed and desired to secure by Letters Patent:

1. A valve for controlling a vacuum supply comprising
   a supporting base having a continuous outer wall that defines a cylindrical inner bore and a base wall connected to said outer wall at one end of said bore, said base wall having an elevated center portion extending into said bore, said elevated portion having an opening formed therein defining a valve seat, said opening being arranged to communicate with a vacuum supply,
   a hollow, generally hemispherical ball adapted to reciprocate within said inner bore with the outer surface of said ball exposed, the diameter of said ball being slightly less than the diameter of said inner bore to form an air passageway around the ball, an elongate post secured to the inner surface of said ball having one end adapted to extend through the opening in said elevated portion of the base wall, an elastomeric valve member secured to said end of said post, adapted to engage the valve seat, and
   resilient means secured between said supporting base and said ball, said means normally biasing the valve into a closed position with the valve member in sealing contact with said valve seat.

2. A valve as described in claim 1, wherein said ball is formed of a material having a low coefficient of friction.

3. A valve as described in claim 1, wherein said ball is formed of nylon.

4. A valve as described in claim 1, wherein said ball includes a retaining lip formed around the periphery of said inner surface and wherein said resilient means comprises a coil spring, normally compressed, having one end positioned adjacent said retaining ring and the other end positioned adjacent the elevated portion of said base wall.

5. A valve for controlling a vacuum supply comprising,
   a supporting base having a cylindrical cavity formed therein bounded at a bottom end by a base wall having an elevated portion that extends into said cavity, said elevated portion having an opening formed therein,
   a hollow member having a continuous side wall bounded at an outer end by a rounded outer surface, said hollow member adapted to fit loosely within said cavity for reciprocal movement therein with said rounded outer surface extending from said cavity, a post secured to said member extending through said opening, an elastomeric valve member secured to said post adapted to sealingly engage said base around said opening, and resilient means secured between said supporting base and said hollow member for biasing said elastomeric valve member into engagement with said base around said opening to close said valve.

* * * * *